(12) United States Patent
Ogura

(10) Patent No.: US 6,934,051 B1
(45) Date of Patent: Aug. 23, 2005

(54) PRINTER

(75) Inventor: Takehiko Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 09/698,215

(22) Filed: Oct. 30, 2000

(30) Foreign Application Priority Data

Nov. 1, 1999 (JP) ............................................ 11/311284

(51) Int. Cl.$^7$ ........................... G06K 15/02; H04N 1/40; H04N 1/46
(52) U.S. Cl. ...................... 358/1.17; 358/530; 358/537; 358/443; 358/452; 358/448
(58) Field of Search ................................ 358/1.9, 1.17, 358/443, 452, 448, 530, 537

(56) References Cited

U.S. PATENT DOCUMENTS

| | | | |
|---|---|---|---|
| 6,507,415 B1 * | 1/2003 | Toyoda et al. ............... | 358/450 |
| 6,529,289 B1 * | 3/2003 | Konno et al. ............... | 358/1.17 |

FOREIGN PATENT DOCUMENTS

| | | | | |
|---|---|---|---|---|
| JP | 5-201077 | 8/1993 | | |
| JP | 6-259204 | 9/1994 | | |
| JP | 10-11363 | 1/1998 | | |
| JP | 10-329369 | 12/1998 | | |
| JP | 10329369 A | * 12/1998 | ............... | B41J/5/30 |
| JP | 2000-68999 | 3/2000 | | |
| JP | 2000-165652 | 6/2000 | | |
| JP | 2000-168172 | 6/2000 | | |
| JP | 2000-253241 | 9/2000 | | |
| JP | 2001-51960 | 2/2001 | | |

OTHER PUBLICATIONS

Japanese Office Action dated Sep. 24, 2002, with partial English translation.

* cited by examiner

*Primary Examiner*—Edward Coles
*Assistant Examiner*—Chan S. Park
(74) *Attorney, Agent, or Firm*—McGinn & Gibb, PLLC

(57) ABSTRACT

A printer has two or more boards. Each board comprises a pre-editing unit which extracts format information from the start of non-delimited received data to sequentially delimit the data into pages beginning with the start of the received data and calculates a temporary page change position that is the trailing end of one page whose start is the leading end of the non-delimited data, an editing unit which edits data following the temporary page change position, calculates an actual page change position that is the trailing end of one page whose leading end is the temporary page change position, and outputs the editing data of the page, and a drawing unit which performs drawing processing in which the editing data is drawn and video output data is output. In addition, when the pre-editing unit of a board completes pre-editing processing, the pre-editing unit of some other board, on which none of pre-editing processing, editing processing, and drawing processing is performed, starts pre-editing processing for calculating a temporary page change position of the next page even if editing processing calculating an actual page change position of the page, for which the temporary page change was calculated by the pre-editing processing, is not yet completed.

9 Claims, 16 Drawing Sheets

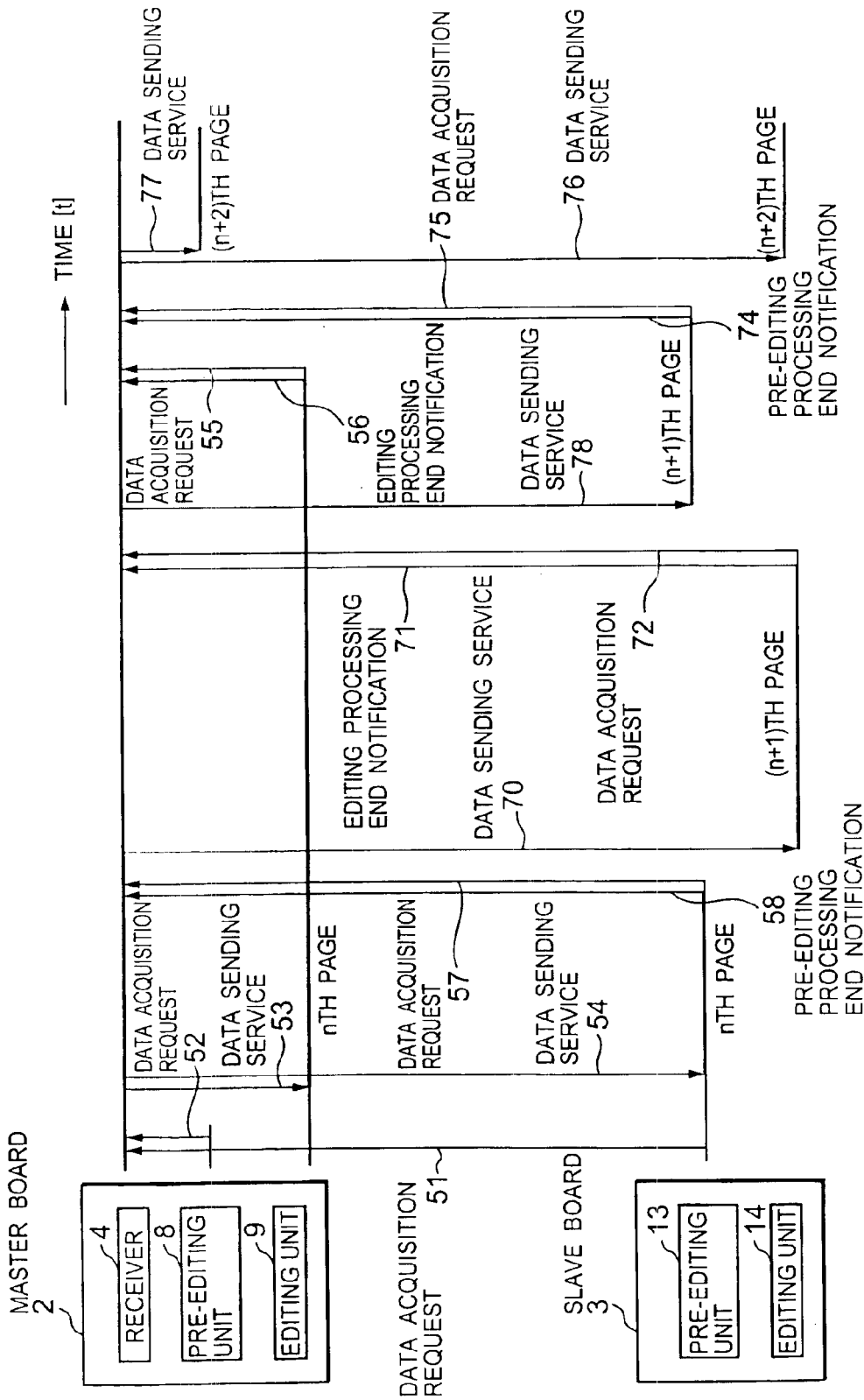

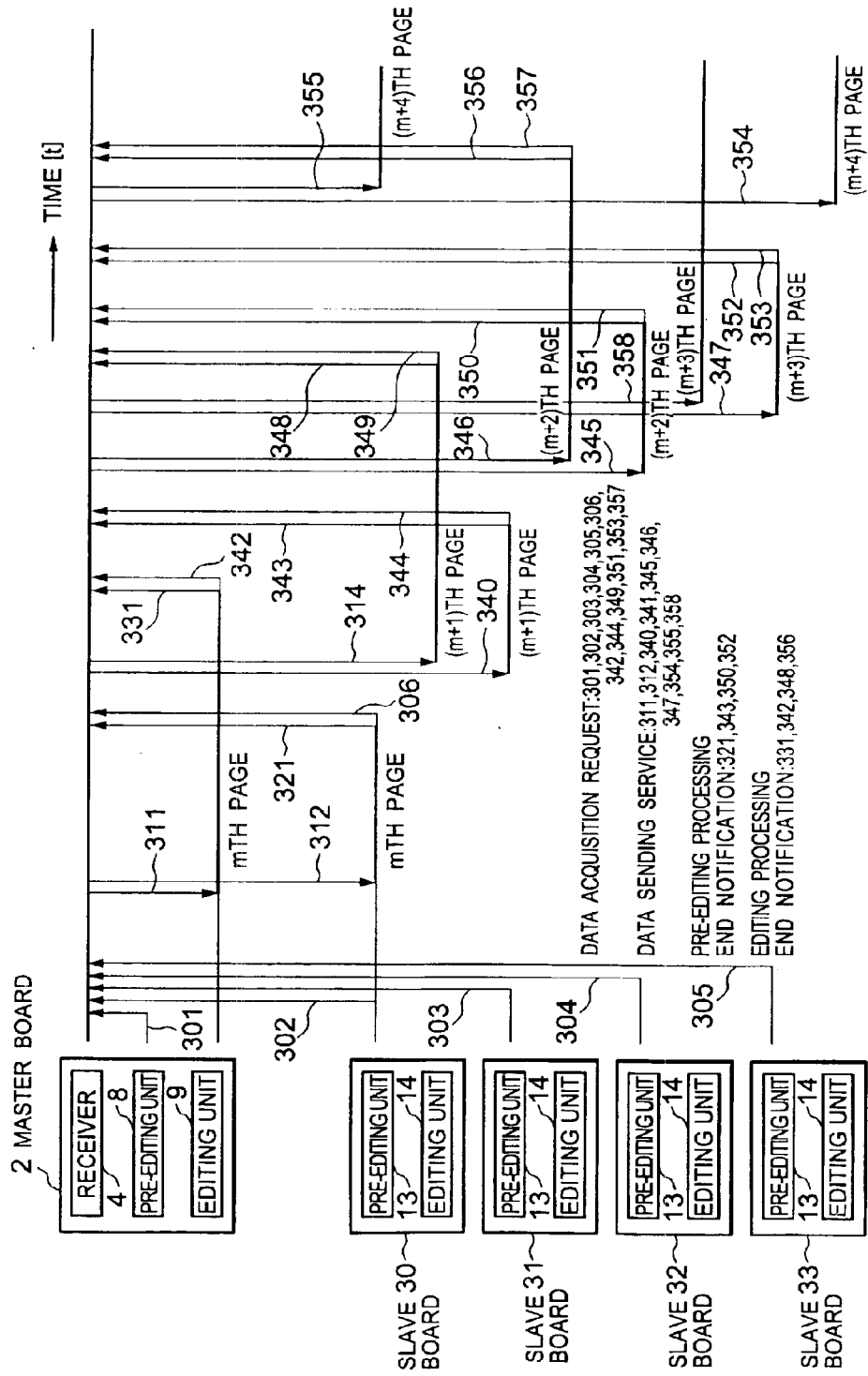

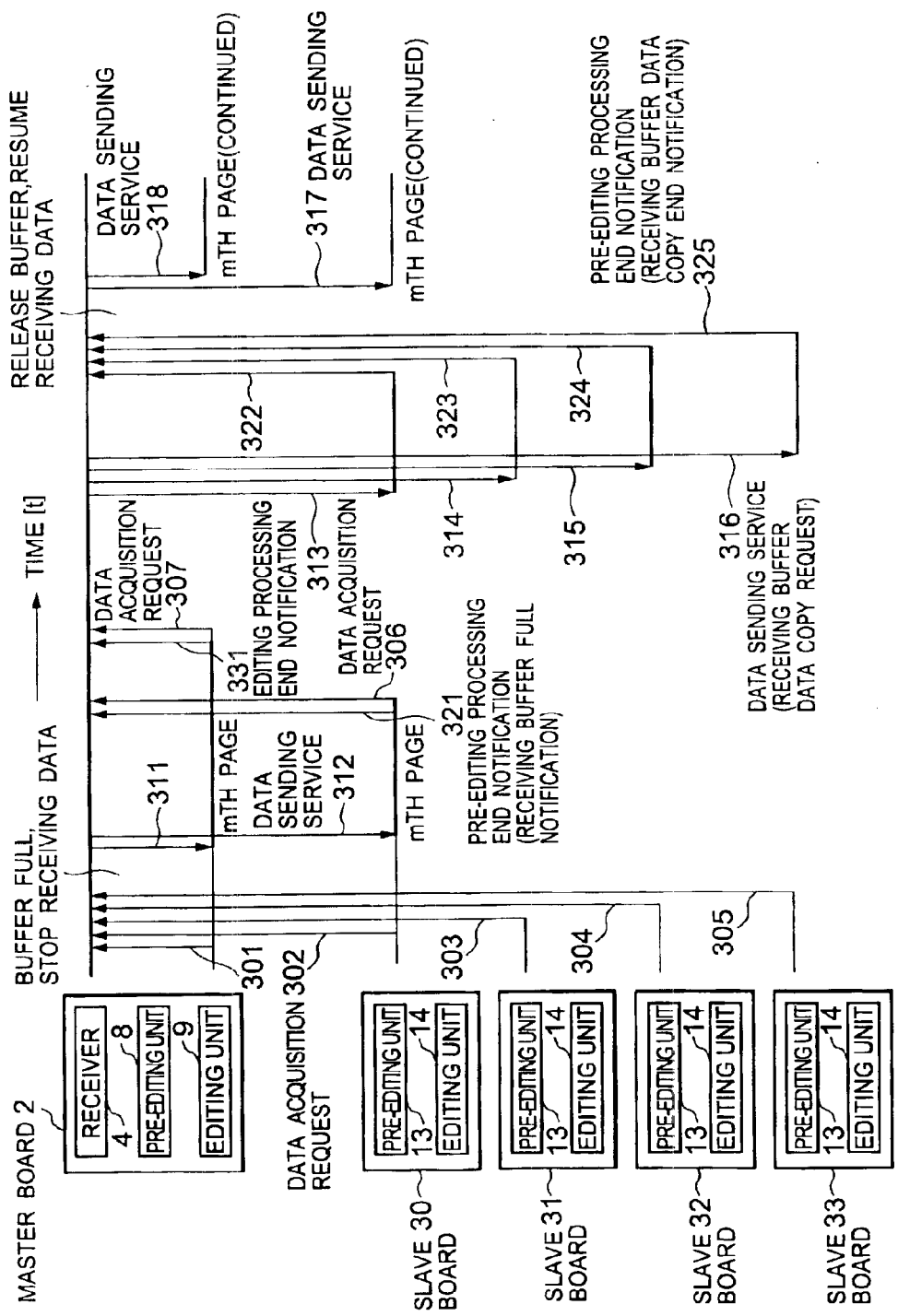

PRINTER

BACKGROUND OF THE INVENTION

1. Field of the Invention

The present invention relates to the editing of printer output data into an output format, and more particularly to a printer that edits line printer output data into a page printer output format and outputs the data.

2. Description of the Related Art

Japanese Patent Laid-Open Publication No. Hei 5-201077 and Japanese Patent Laid-Open Publication No. Hei 10-329369, in which the prior art is disclosed, will be described. The print control method and the print controller disclosed in Japanese Patent Laid-Open Publication No. Hei 5-201077 will be described with reference to FIG. 12. Referring to FIG. 12, a print controller A1, which receives data from a host computer A10, processes received data with a master processor module A100, a slave processor module A110, and a slave processor module A120, one page at a time. The commands transferred between the host computer A10 and the print controller A1 are classified into two types, constraint commands A11A1 and non-constraint commands A11A2, as shown in FIG. 13. Referring to FIG. 14, the constraint command A11A1 is composed of a command A92 which defines parameters effective for all pages of a document, a reset command BA93, a command string A94 composed of drawing attribute parameter setting commands and drawing commands, a reset command BA96, and a page change A95 or a page change A98 which is always added as a page delimiter. Therefore, even if the processors A100, A110, and A120 perform processing in parallel, one page at a time, there is no effect on the print result because there is no format information effective across pages and therefore. However, this print control method and the print controller have the following problems.

The first problem is that, when a non-constraint command A11A2 is executed on a printer controller A11 for printing at a high speed as shown in FIG. 13, the host computer A10 must always convert (A11B) the non-constraint command to a constraint command. In other words, when the type of the host computer A10 changes, conversion A11B from a non-constraint command to a constraint command is necessary.

The second problem is that, when a non-constraint command A11A2 is printed without being converted to a constraint command A11A1, it is judged that the page delimiter is issued only when the specification, such as the paper size or the number of copies which are specified for a page only once, is changed at the start of a page. Therefore, when the character size or the line feeding amount is changed while a page is output and, as a result, the number of lines exceeds the page length, the print result is not output correctly.

Next, the printer disclosed in Japanese Patent Laid-Open Publication No. Hei 10-329369 will be described with reference to FIG. 15. A printer B1 shown in FIG. 15 receives data B21 from a host computer into the receiving buffer via an interface controller B4 of a master board B2. Format information that is searched for is stored in a format information storage unit B6 or B11. Editing units B7 and B12 each reference the received data B21 and the format information storage unit B6 or B11 to start editing. Edited and updated format information and page change information are stored in the format information storage unit B6 or B11. Drawing units B8 and B13 process the edited data B21 and B25 and generate video output data as drawn data B26. A printing unit B9 receives the drawn data B26, manages page numbers, and outputs the video output data to an engine in the DMA output mode. The operation will be described with reference to the timing chart shown in FIG. 16. In FIG. 16, when the master board B2 starts the editing processing of the first page, a slave board B3 starts the pre-editing processing of the first page. Next, when the master board B2 starts drawing processing, the slave board B3 starts editing processing. After the editing processing is completed, changed information is written back into the format information storage unit B6 or B11 and the editing processing of the next page starts by referring to that information. Thus, the print result is always valid even for data whose page change code is not definite. However, a processor must wait during editing processing until the editing processing of the preceding page is completed. Therefore, at the time the pre-editing processing is completed, only the editing of the preceding page is completed. The detection of format information and the detection of the page delimiter, performed during the pre-editing processing, become meaningless. The result is that, after pre-editing processing, only the format information set up for the preceding page is copied into the format information storage area. In addition, when data requires much editing time, performance is significantly reduced.

As described above, the problem with the technology disclosed in the former publication is as follows. When a non-constraint command A11A2 is executed on a printer controller A11 for printing at a high speed, the host computer A10 must always convert (A11B) the non-constraint command to a constraint command. In other words, when the type of the host computer A10 changes, conversion A11B from a non-constraint command to a constraint command for a new computer is necessary. In addition, when a non-constraint command is printed without being converted to a constraint command, it is judged that the page delimiter is issued only when the specification, such as the paper size or the number of copies which are specified for a page only once, is changed at the start of a page. Therefore, when the character size or the line feeding amount is changed while a page is output and, as a result, the number of lines exceeds the page length, the print result is not output correctly.

The problem with the technology disclosed in the latter publication is as follows. After the editing processing is completed, changed information is written back into the format information storage unit B6 or B11 and the editing processing of the next page starts by referring to that information. Thus, the print result is always valid even for data whose page change code is not definite. However, a processor must wait during editing processing until the editing processing of the preceding page is completed. Therefore, at the time the pre-editing processing is completed, only the editing of the preceding page is completed. The detection of format information and the detection of the page delimiter, performed during the pre-editing processing, become meaningless. The result is that, after pre-editing processing, only the format information set up for the preceding page is copied into the format information storage area. In addition, when data requires much editing time, performance is significantly reduced.

SUMMARY OF THE INVENTION

It is an object of the present invention to provide a quick and correct print result for existing data created by non-constraint commands.

It is another object of the present invention to allow a printer to start editing the next page without waiting for the completion of the editing processing of the preceding page in order to increase performance.

To achieve the above objects, the present invention provides a printer which draws page data for outputting one page at a time, the page data being edited from line printer output format to a page format based on format information. The printer comprises one master board and one or more slave boards each executing pre-editing processing in which a temporary page change position delimiting pages is calculated with the data unedited; editing processing in which data in a next page following the temporary page change position is edited based on the format information to define an actual page change position and the temporary page change position is corrected by the actual page change position to define the page data of the next page; and drawing processing in which the page data is drawn, wherein the master board and slave boards execute the pre-editing processing of the data before the editing processing and the drawing processing.

In addition, the master board comprises a basic unit transferring the data and control information to or from processing units and to or from the slave boards, wherein the processing units, all connected to the basic unit, include a receiver which receives the data from a host computer; a receiving buffer in which the data is stored; a pre-editing unit which acquires data from the receiving buffer and calculates the temporary page change position; a second format information storage unit in which format information on a next page following the temporary page change position is stored; a first format information storage unit in which format information common to edited pages is accumulated by obtaining the format information on the edited pages from the second format information storage unit; an editing unit which edits the next page following the temporary page change position defined by the pre-editing unit to define the actual page change position based on the format information stored in the first and second format information storage units, corrects the temporary page change position with the actual page change position, and defines the page data of the next page; a drawing unit which generates drawing data from the page data; a print controller which converts the drawing data into video output data; an output controller which transfers the video output data sent from the print controller and from a print controller of the slave boards to a printer engine to manage a page of the video output data; and a user interface which sends or receives operation information to or from an operator panel operated by a user.

In addition, each of the slave boards comprises a basic unit transferring the data and control information to or from processing units and to or from the master board, wherein the processing units, all connected to the basic unit, include a pre-editing unit which calculates the temporary page change position of data acquired from a receiving buffer; a second format information storage unit in which format information on a next page following the temporary page change position is stored; an editing unit which edits the next page to define the actual page change position based on the format information stored in a first format storage unit in which common format information is stored and in the second format information storage unit, corrects the temporary page change position with the actual page change position, and defines the page data of the next page; a drawing unit which generates drawing data from the page data; and a print controller which converts the drawing data into video output data.

In addition, the receiving buffer cyclically uses a buffer area in which data from the host computer is stored and an area which is used for the editing processing and, when the buffer becomes full before the page change position is detected during the editing processing, stops receiving the data and synchronizes the format information by distributing the so-far received data among the master board and the slave board to avoid a buffer overflow and to continue processing.

In addition, the pre-editing unit checks whether or not statements coded in a page printer description language are present and, when statements coded in the page printer description language are found, defines a position defined by page change information as the page change position and, when there is no statement coded in the page printer description language, calculates the temporary page change position from a number of characters and a number of lines, the temporary page change position delimiting pages.

In addition, the common format information, which is the format information passed across edited paged, includes character pitch information, character size information, left margin information, right margin information, horizontal tab information, vertical tab information, line feeding information, font information, character decoration information, paper size information, print orientation information, number-of-copies information, form information, external character definition information, and page change information.

Also, the printer according to the present invention comprises two or more boards, each comprising a pre-editing unit which performs pre-editing processing in which, in order to delimit received data into pages, format information is extracted from a start of non-delimited data beginning with the start of the received data and a temporary page change position is calculated, the temporary page change position being a trailing end of a page whose leading end is the start of the non-delimited data; an editing unit which performs editing processing in which data following the temporary page change position is edited and an actual page change position is calculated to output editing data of a page, the actual page change position being an actual trailing end of the page whose leading end is the temporary page change position; and a drawing unit which performs drawing processing in which the edited data is drawn and video output data is generated, wherein, when a pre-editing unit of a first board completes first pre-editing processing, a pre-editing unit of a second board where none of pre-editing processing, editing processing, and drawing processing is performed starts pre-editing processing in which, even if the first editing processing calculating an actual page change position of a page whose temporary page change position was calculated by the first pre-editing processing is not yet completed, a temporary page change position of a page beginning with the temporary page change position calculated by the first pre-editing processing is calculated.

According to the present invention, when a pre-editing unit of a board completes pre-editing processing, some other board on which none of pre-editing processing, editing processing, and drawing processing is performed, starts pre-editing processing for calculating a temporary page change position of the next page even if editing processing calculating an actual page change position of the page, for which the temporary page change was calculated by the pre-editing processing, is not yet completed. Therefore, the printer according to the present invention eliminates the need for replacing, via the printer driver or the data filter, existing line-printer user data with data coded in page printer description language, enabling a page printer to print data quickly.

BRIEF DESCRIPTION OF THE DRAWINGS

FIG. 5 is a diagram showing data acquisition requests issued to the receiving buffer of the printer shown in FIG. 1.

FIG. 9 is a diagram showing data acquisition requests issued to the receiving buffer of the printer shown in FIG. 7.

FIG. 10 is a diagram showing the timing chart when a receiving buffer full condition occurs on the printer shown in FIG. 7.

DETAILED DESCRIPTION OF THE PREFERRED EMBODIMENTS

Figure 1:
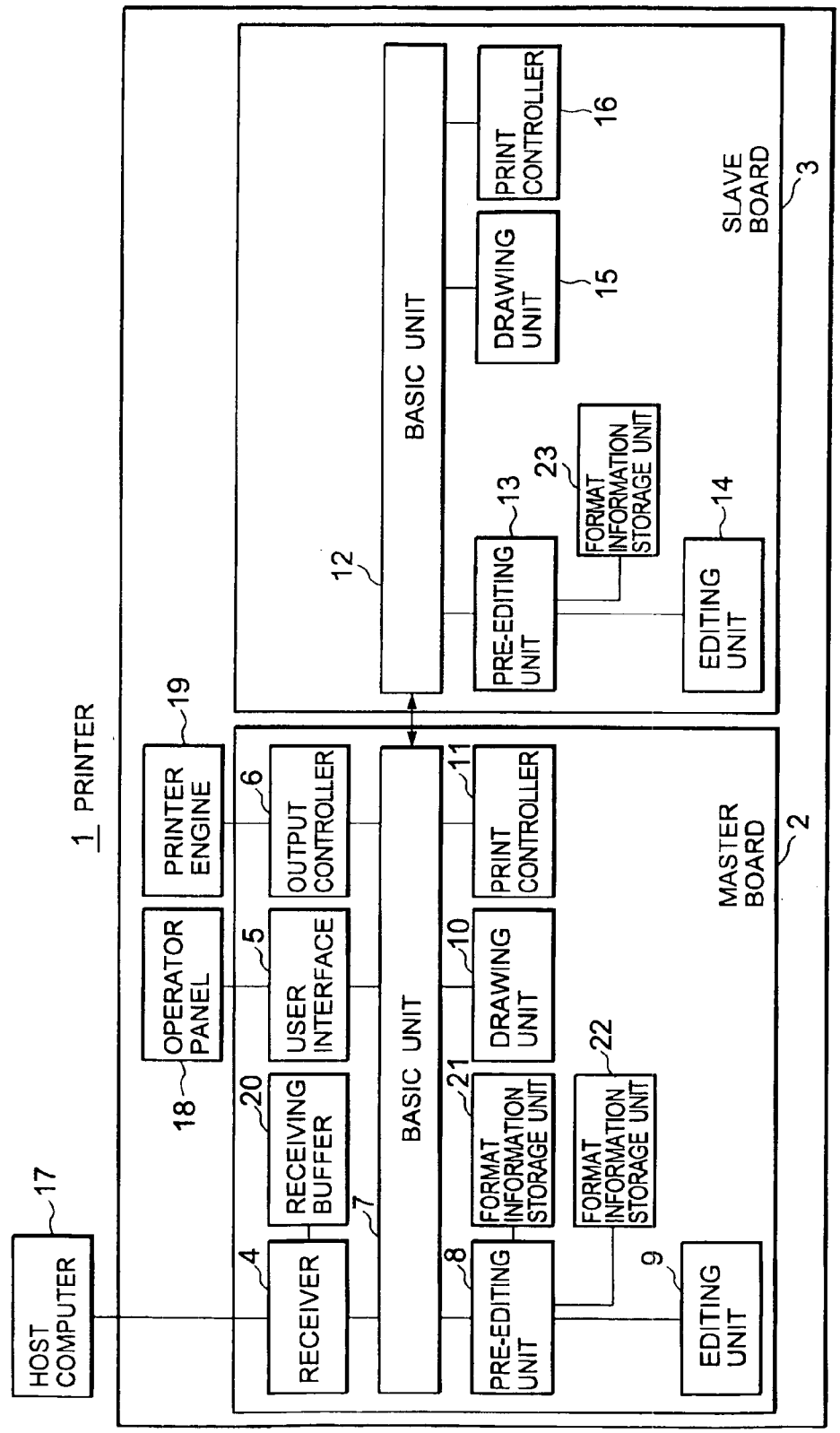
FIG. 1 is a diagram showing the configuration of a printer in a first embodiment of the present invention.

Referring to FIG. 1, a printer 1 used in a first embodiment of the present invention is shown.

As shown in FIG. 1, the printer 1 comprises a master board 2 and a slave board 3.

In response to a data send request from a host computer 17, a receiver 4 of the master board 2 stores data, received from the host computer 17, into a receiving buffer 20 acquired from a basic unit 7 in advance.

A pre-editing unit 8 issues a data acquisition request to the receiver 4 via the basic unit 7.

Similarly, the slave board 3 issues a data acquisition request to the receiver 4 via the basic unit 7 connected to a basic unit 12.

The basic units 7 and 12 provide other processing units with printer internal resources available only to the master board 2 as if those resources were connected to any processor. The printer internal resources available only to the master board 2 include a printer engine 19, an operator panel 18, auxiliary storage media not shown in the figure such as a non-volatile memory, a hard disk, and a floppy disk, and a receiving interface.

The receiver 4 receives all data requests from the boards on which processors are mounted. If there is data to be sent, the receiver 4 sends data to the pre-editing unit 8 or 13. When sending data, the receiver 4 sends the start address and the size of data, not actual data, in order to reduce the overhead time required for copying data between boards.

The pre-editing unit 8 or 13 performs one of two types of processing according to the state of its own processor.

Figure 2:
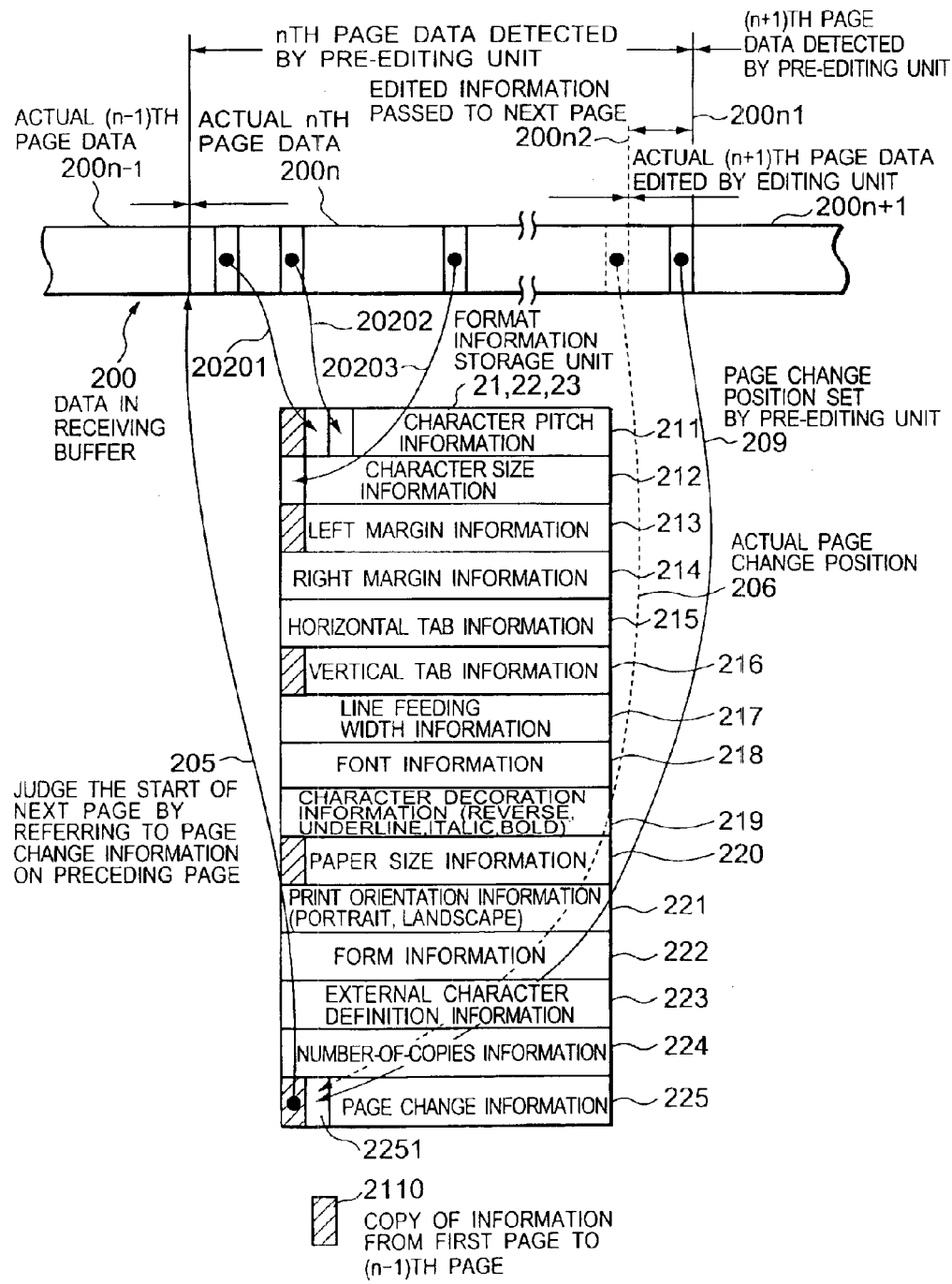
FIG. 2 is a diagram showing format information stored in the format information storage unit shown in FIG. 1.

The first processing is performed when its own processor is executing pre-editing processing. In this case, as shown in FIG. 2, the pre-editing unit 8 or 13 stores format information, which is contained in the pages up to the page immediately preceding the page to be processed by its own processor, from a format information storage unit 21 into a format information storage unit 22 or 23. The pre-editing unit then detects the page delimiter in the format information, writes back the format information into the format information storage unit 21 via the basic unit 7 or 12, and informs the receiver 4 that the format information has been written.

The second processing is performed when its own processor is executing editing processing. In this case, the pre-editing unit 8 or 13 sends format information from the format information storage unit 22 or 23 to an editing unit 9 or 14 and edits actual data.

The editing unit 9 or 14 edits actual data based on the format information detected by the pre-editing unit 8 or 13. When the format information is updated, the editing unit 9 or 14 writes back the format information into the format information storage unit 21.

A drawing unit 10 or 15 receives edited page data from the editing unit 9 or 13, generates drawing data, and passes it to a print controller 11 or 16.

The print controller 11 or 16 generates video output data from the drawing data and passes it to the output controller 6.

The output controller 6 manages pages, which are output one page at a time, and starts video DMA operation for the printer engine 19.

Referring to FIG. 2, page delimiter calculation processing performed by the pre-editing unit 8 or 13 shown in FIG. 1 and the configuration of format information stored in the format information storage units 21, 22, and 23 for use by the pre-editing unit 8 or 13 are shown.

The master board 2 has the format information storage unit 22 that is used for the processing of its own processor and the format information storage unit 21 that is shared by the master board 2 and the slave board 3. On the other hand, the slave board 3 has only the format information storage unit 23 used for the processing of its own processor.

Before pre-editing processing, the common format information stored in the format information storage unit 21, which is shared by the master board 2 and the slave board 3, is read into the format information storage unit 22 or 23 used for the processing of its own processor. When pre-editing processing is completed or if a mismatch is found in the format information after editing processing, the format information is written back into the format information storage unit 21. As a result, the format information storage unit 21 shared by the master board 2 and the slave board 3 stores therein format information common to the pages immediately preceding the page that is to be processed.

The common format information refers to information passed from page to page, that is, format information of the immediately preceding page or format information set up not for the immediately preceding page but for the pages preceding the immediately preceding page. More specifically, the common format information includes character pitch information 211, character size information 212, left margin information 213, right margin information 214, horizontal tab information 215, vertical tab information 216, line feeding width information 217, font information 218, character decoration information 219 (reverse print, underline, italic, bold), paper size information 220, print orientation information 221 (portrait, landscape), form information 222, external character definition information 223, number-of-copies information 224, and page change information 225.

The pre-editing unit 8 or 13 first checks if there are statements coded in the page printer description language. If there are statements coded in the page printer description language, the pre-editing unit 8 or 13 stores format information existing before the page change information into the format information storage unit 22 or 23 (20201, 20202, 20203). The offset from the start address of the data received from the receiver 4 is stored in the pointer format.

If there is no statement coded in the page printer description language, the pre-editing unit 8 or 13 calculates the page delimiter position from the number of characters and the number of lines and, as with the statements coded in the page printer description language, stores format information existing before the page change information into the format information storage unit 22 or 23 (209).

A check is made for the number of characters per line considering the fact that the number of lines increases when a right margin overflow is caused by an automatic page change because of too many characters. The format information which may be involved in a right margin overflow includes the character pitch information 211, character size information 212, left margin information 213, right margin information 214, horizontal tab information 215, font information 218, paper size information 220, and print orientation information (portrait, landscape) 221.

A check is made for the number of lines considering the fact that a bottom margin overflow may cause an automatic page change. The format information which maybe involved in a bottom margin overflow includes vertical tab information 216, line feeding width information 217, and paper size information 220. In addition, a right margin overflow, which generates the number of lines exceeding the number of lines per page, also causes a bottom margin overflow.

It should be noted that, even if a page delimiter position is detected considering the format information, actual editing processing is not performed. The delimiter position value, which is a calculated value, may include an error. The pre-editing unit 8 or 13 would perform the same processing as the editing unit in order to eliminate this error, meaning that there is no meaning in performing pre-editing processing. Therefore, when an error is generated, the editing unit 9 or 14 changes the page change position 209 calculated during pre-editing processing to the page change position 206 generated as a result of editing processing and stores the corrected value in the format information storage units 21, and 22 or 23 to allow correct format information to be passed from page to page. (206)

Another function of the pre-editing unit 8 or 13 is to copy all data from the receiving buffer 20 to a local memory of each processor, not shown in the figure, when the receiving buffer 20 becomes full. Because the pre-editing unit 8 or 13 does not release data acquired from the receiver 4 until the page delimiter is detected, this copy operation forces the receiving buffer 20 to be released for continued processing.

Next, the operation of the printer 1 shown in FIG. 1 will be described with reference to the timing chart shown in FIG. 3 while referring to the timing chart, shown in FIG. 5, of a data acquisition request issued to the receiving buffer 20. In the example shown in FIG. 3, the first page 2001 of data 200 stored in the receiving buffer 20 contains double-sided printing data which takes long in drawing. The page change position of each page is not definite, and six pages of print data, page 2001 to page 2006, will be printed beginning with the master board 2.

First, for the received data 200 stored into the receiving buffer 20 by the receiver 4 shown in FIG. 1, the same data (start address of the receiving buffer and the size) is sent (53 and 54 in FIG. 5) in response to a data acquisition request (51 in FIG. 5) from the pre-editing unit 13 and a data acquisition request (52 in FIG. 5) from the pre-editing unit 8. However, because neither the pre-editing unit 8 nor the pre-editing unit 13 has no means for determining which will perform editing processing for the first page, the receiver 4 notifies that editing processing will be performed by the master board 2 and that pre-editing processing will be performed by the slave board 3.

Because there is no preceding page data, the pre-editing unit 8 of the master board 2 performs no processing but passes actual data to the editing unit 9 for editing processing.

The pre-editing unit 13 of the slave board 3 searches the format information on the first page 2001 for the page change position, stores the format information into the format information storage unit 23, and updates the format information in the format information storage unit 21 of the master board 2. The pre-editing unit also updates the read pointer of the receiving buffer 20 and informs the receiver 4 that the pre-editing processing of the first page 2001 has finished (58 in FIG. 5).

When pre-editing processing 20011 of the first page 2001 is completed, the editing unit 14 starts editing processing 20022 of the second page 2002 without waiting for the completion of the editing processing 20012 of the first page 2001.

When the editing processing 20012 on the master board 2 is completed, the page change position of the first page 2001 detected by the pre-editing unit 13 of the slave board 3 is compared with the page change position detected by the editing unit 9 to check if they are the same.

One of the reasons for a mismatch in the page change position is a character size change during processing of a line. A character size change causes a line pitch change which, in turn, causes a bottom margin overflow and an automatic page change. Also, a character pitch change causes a right margin overflow and an automatic page change, which may increase the number of lines and generate a bottom margin overflow and an automatic page change. If the pre-editing unit 8 or 13 must detect these factors, they would have to perform the same processing as the editing unit 9 or 14. In this case, the pre-editing unit 8 or 13 according to the present invention, which quickly detects the format information and a page change position and passes them to the next page, becomes meaningless.

When the page change positions (200n1 and 200n2 in FIG. 2) differ and the page change position detected by the pre-editing unit 13 is nearer to the start of the acquired received data, information from the page change position detected by the pre-editing unit 13 to the page change position detected by the editing unit 9 is passed to the editing unit 14.

Because the editing unit 14 performs extra editing, the editing data received from the editing unit 9 is deleted. Conversely, when the page change position detected by the editing unit 9 is nearer to the start of the receiving buffer, the editing unit 9 performs the editing processing of data from the page change position (200n2 in FIG. 2) detected by the editing unit 9 to the page change position (200n1 in FIG. 2) detected by the pre-editing unit 13 and passes the result to the editing unit 14 of the slave board 3.

In this way, by adjusting editing data with the other processor after completion of the editing processing, the page change position can be detected correctly although the immediately preceding page and the currently-editing page are asynchronous and, at the same time, the correct format information can be passed.

After that, the master board 2 and the slave board 3 perform the drawing processing via the drawing unit 10 or 15 to generate video output data.

The slave board 3 which has completed processing earlier, the print controller 16 passes the pointer to the video output data to the output controller 6 of the master board 2. At this time, because the master board 2 has not yet completed the drawing processing of the first page (20013 in FIG. 3), the processing 2003 of the third page is performed again by the slave board 3.

Figure 3:
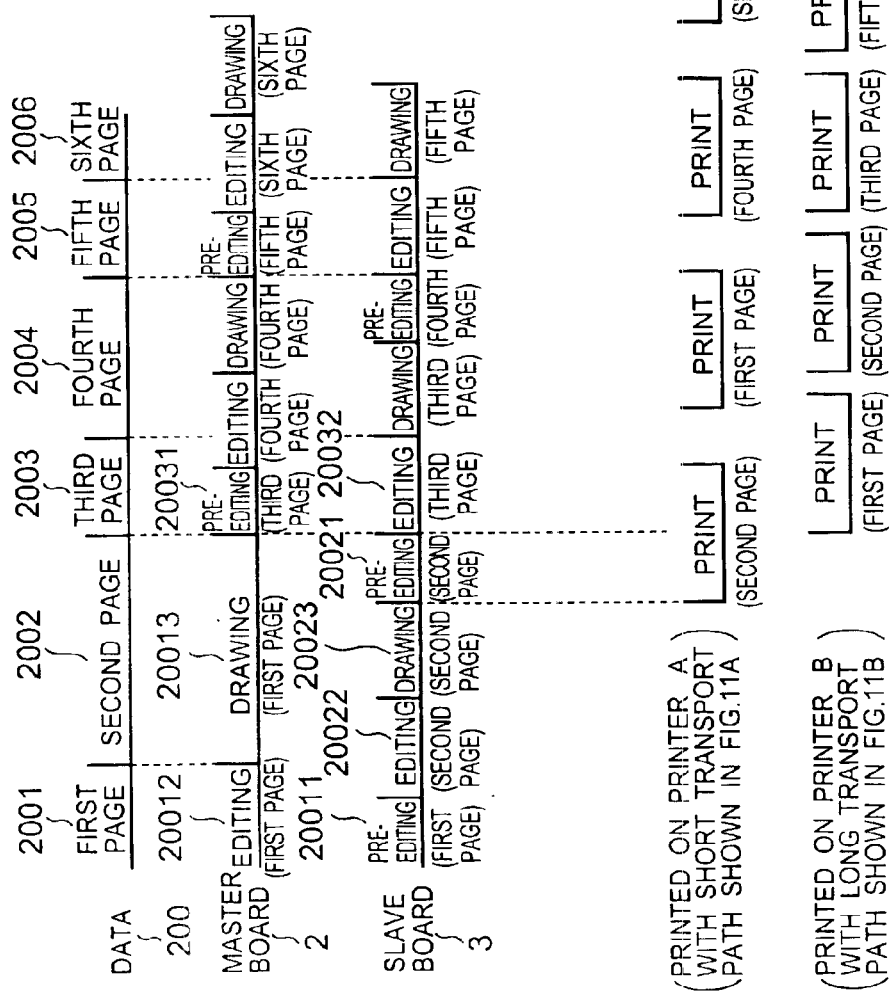
FIG. 3 is a diagram showing the timing chart of the printer shown in FIG. 1.

The slave board 3 references the format information storage unit 21 of the master board 2, checks that the page change position information has been updated (pre-editing processing 20011 of the first page 2001 in FIG. 3 is completed), and then causes the pre-editing unit 13 to start the pre-editing processing of the second page 2002. When the pre-editing processing 20021 is completed, the editing unit 14 starts editing processing 20032 of the third page 2003.

When the editing processing 20032 is completed, the page change position 209 detected by the pre-editing unit 13 and the page change position 206 detected by the editing unit 14 are compared. In the example shown in FIG. 3, there should be no mismatch because the editing processing 20022 of the second page 2002 is already completed. The pre-editing unit 8 of the master board 2 checks that the pre-editing processing 20021 of the second page 2002 is completed and starts pre-editing processing 20031 of the third page.

In this way, instead of alternating processing between the master board 2 and the slave board 3, one of the two boards whose processor is free can start processing. In addition, when the pages are not delimited definitely, processing across two pages allows editing to be performed quickly with no need for synchronizing editing processing.

Figure 4A:
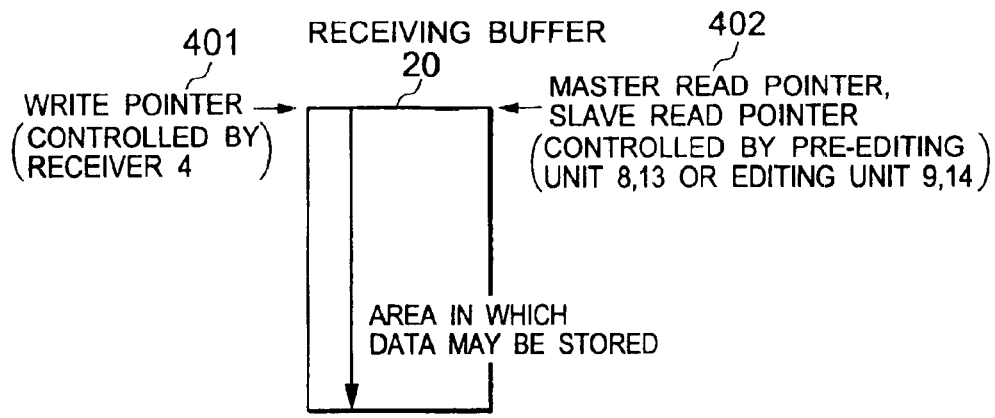
FIGS. 4A, 4B, and 4C are diagrams showing the management of the receiving buffer of the printer shown in FIG. 1.
Figure 4B:
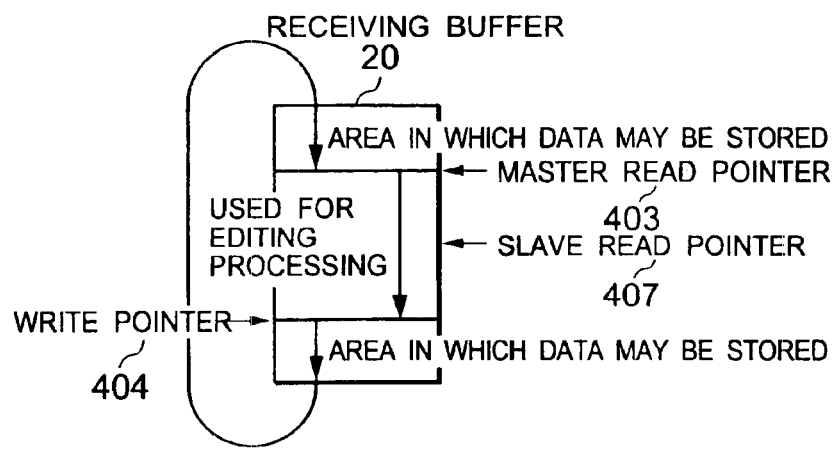
Figure 4C:
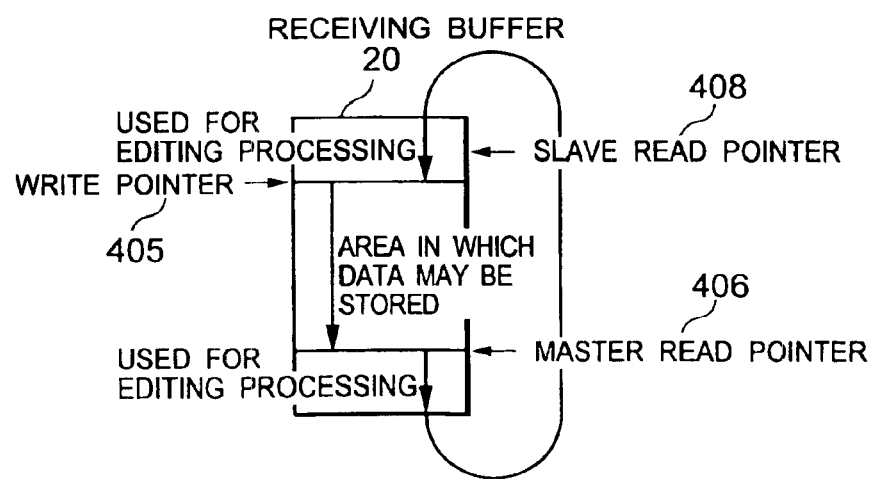

As shown in FIGS. 4A, 4B, and 4C, the receiving buffer 20 is managed in the ring buffer mode. The write pointer is updated by the receiver 4, while the read pointer is updated by the pre-editing unit 8 or 13 and by the editing unit 9 or 14 of each processor. The receiver 4 references these pointers to determine which area is being used for editing and into which area data can be received.

In FIG. 4A, a write pointer 401 and a read pointer 402 point to the same position. This state indicates that data in the receiving buffer is not used for editing and that data can be received in any area in the buffer.

In FIGS. 4B and 4C, write pointers 404 and 405 and read pointers 403, 406, 407, and 408 point to different positions. In addition, there are a plurality of read pointers 403, 407, 406, and 408.

In this case, a search is made for a read pointer in the high-order physical address direction beginning with the position pointed to by the write pointer 404 or 405. If the read pointer is not found until the end address of the receiving buffer is reached, a search is made again beginning with the start address of the receiving buffer. Data are received into an area from the position pointed to by the write pointer to the position immediately preceding the position pointed to by the read pointer that is found first.

Conversely, an area being used for editing or an area whose data is not yet sent by the receiver 4 for editing begins with the position pointed to by the read pointer 403 or 406 that is detected first and ends with the position immediately preceding the position pointed to by the write pointer. 404 or 405 that is found by making a search in the high-order address direction.

As described above, even when there are a plurality of processors and therefore there are a plurality of read pointers, the receiver 4 checks the write pointer and sends data, which is stored in the positions preceding the position pointed to by the write pointer, to the boards for processing. This prevents editing processing from being performed on data beyond the position pointed to by the write pointer. Therefore, an area from the position pointed to by the lowest-address read pointer to the address pointed to by the write pointer is a memory area which is being used for editing or into which data has been received. This is an area from which the receiver 4 has not yet send data to the boards for editing.

Figure 6:
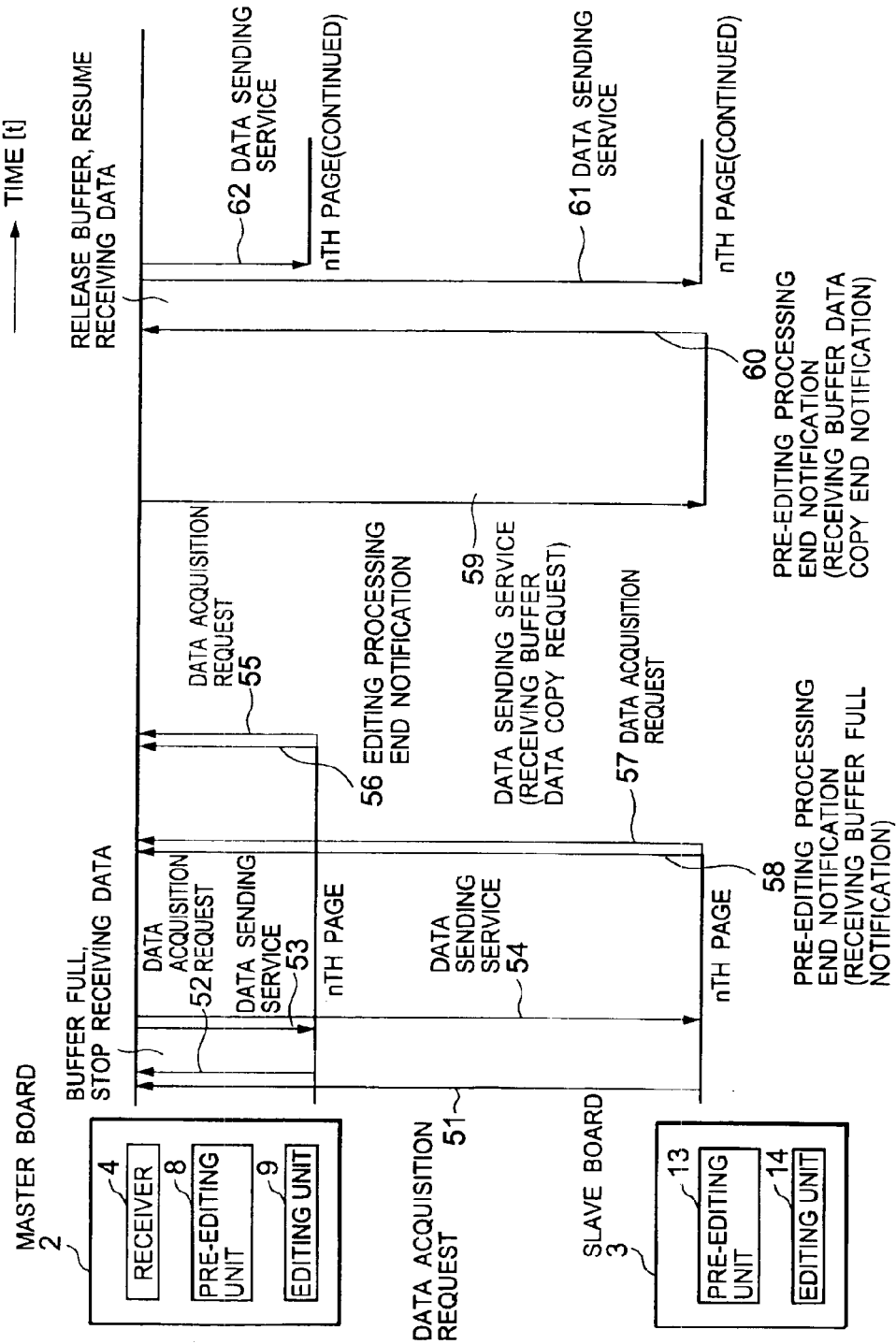
FIG. 6 is a diagram showing the timing chart when a receiving buffer full condition occurs on the printer shown in FIG. 1.

Next, referring to FIG. 6, the following describes how processing is continued when a large amount of form data or external-character data is received and the receiving buffer becomes full.

When the receiver 4 of the master board 2 receives a large amount of form data or external-character data and a receiving buffer full condition occurs in which no free area is found in the receiving buffer 20, the receiver stops receiving data. At this time, the editing unit 9 of the master board 2 sends a data acquisition request 52 to the receiver 4 to perform editing processing for the nth page.

On the other hand, the pre-editing unit 13 of the slave board 3 sends a data acquisition request 51 for the nth page to the receiver 4 to perform pre-editing processing for the (n+1)th page.

In response to the data acquisition requests 51 and 52 from all processors, the receiver 4 performs data sending services 53 and 54 for the editing unit 9 of the master board 2 and for the pre-editing unit 13 of the slave board 3.

Next, the pre-editing unit 13 of the slave board 3 adds a receiving-buffer full parameter to a pre-editing end notification 58 and sends it to the receiver 4. At this time, the read pointer is not updated.

The pre-editing unit 13 of the slave board 3, which has not yet detected the page change position, sends a data acquisition request 57 to the receiver 4 again.

However, the receiver 4 which has no data to send cannot perform data sending service for the data acquisition request 57 received from the pre-editing unit 13 of the slave board 3.

After that, the editing unit 9 of the master board 2 sends an editing end notification 56 to the receiver 4 and updates the read pointer. Then, the editing unit sends a data acquisition request 55 to the receiver because one page of editing processing is not yet completed.

In response to the buffer full notification, the receiver 4 checks that data acquisition requests, 55 and 57, have been received from all processors. The receiver checks those requests to confirm that all processors has no received data to edit.

After confirming the requests from all processors, the receiver 4 issues a receiving-buffer data copy request to all processors, except the one that is performing editing processing, as a parameter of a data sending service 59 to ask each processor to receive data from the receiving buffer into the local memory of the processor. The receiver does not pass data to a processor which is performing editing processing because data is already copied into the local memory and there is no need to copy data any more. Upon receiving the request, the pre-editing unit 13 stores data into the local memory, informs the receiver 4, through a parameter of a pre-editing end notification 60, that the restoration of the receiving-buffer full condition is completed, and then updates the read pointer.

The receiver 4, which has confirmed the notifications from all processors, resumes data reception and performs data sending services 61 and 62, each of which is not yet completed for a page, for the editing unit 9 of the master board 2 and the pre-editing unit 13 of the slave board 3.

The problem with a prior-art printer is that, when the page delimiter cannot be detected because the pre-editing unit 8 or 13 has not yet completed one page of pre-editing processing, subsequent editing processing cannot be performed. The printer described above prevents this condition from occurring.

Figure 7:
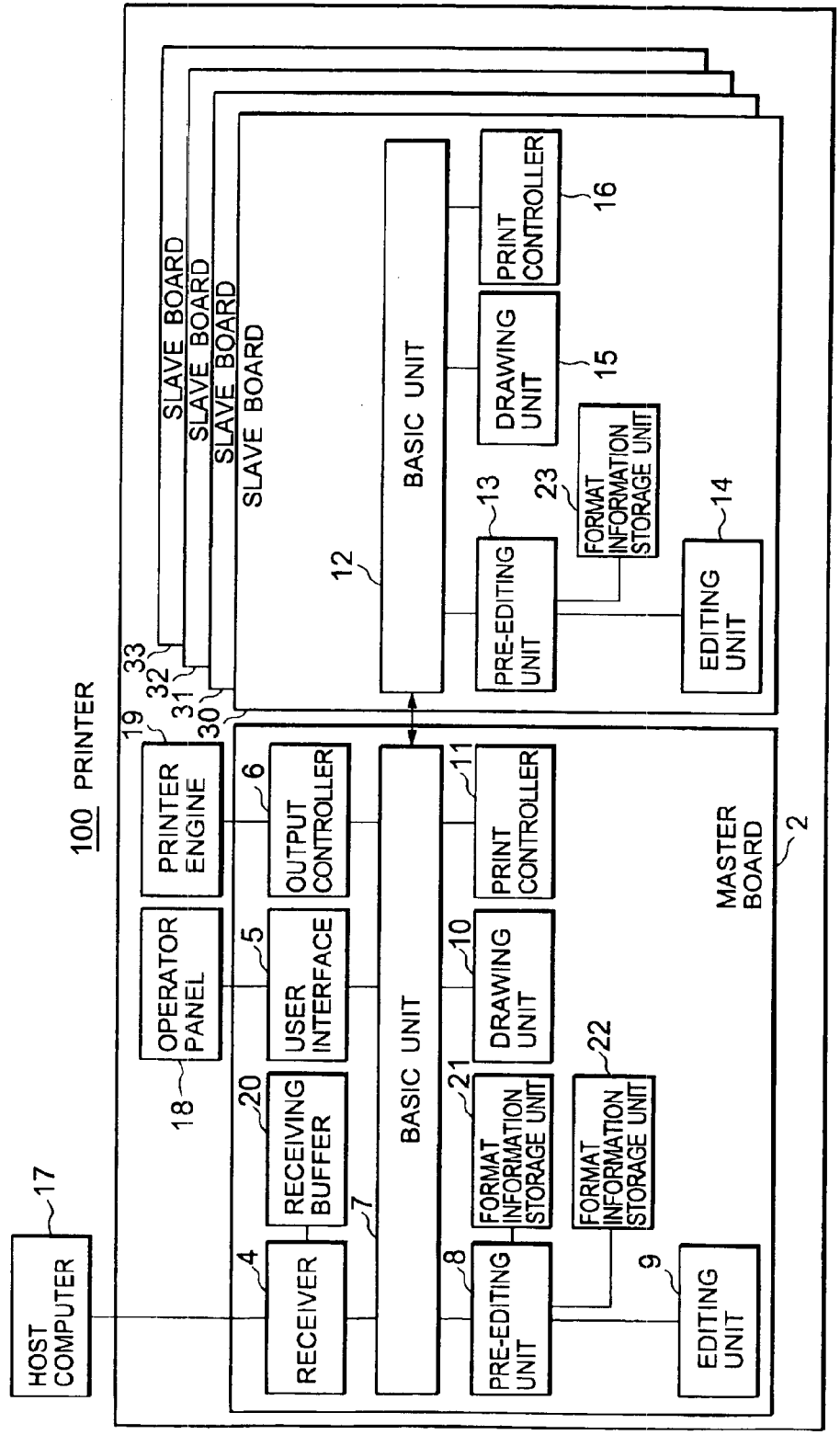
FIG. 7 is a diagram showing the configuration of a printer in a second embodiment of the present invention.

As a second embodiment of the present invention, a printer 100 with a plurality of slave boards 3 will be described. FIG. 7 shows the configuration of the printer 100 with four slave boards 30, 31, 32, and 33. The operation will be described by referring to the timing chart shown in FIG. 8 and the data acquisition requests shown FIG. 9. In the example shown in FIG. 8, the first page 2001 contains double-sided printing data which takes long in drawing. The page change position of each page is not definite, and six pages of print data, page 2001 to page 2006, will be printed beginning with the master board 2.

The receiver 4 shown in FIG. 7 stores data 200 in the receiving buffer 20.

The pre-editing units of the master board 2 and all slave boards 30, 31, 32, and 33 send data acquisition requests 301, 302, 303, 304, and 305 to the receiver 4.

Upon recognizing the data acquisition requests from all processors, the receiver 4 performs the data sending services 311 and 312 to send the same data (start address of the receiving buffer and the size) to the pre-editing unit 8 of the master board 2 and the pre-editing unit 13 of the slave board 30. Because there is no means for the pre-editing units to know which processor is to perform editing processing for the first page 2001, the receiver 4 notifies that editing processing will be performed by the master board 2 and that pre-editing processing will be performed by the slave board 30.

Because there is no data preceding the first page 2001, the pre-editing unit 8 of the master board 2 performs no processing but passes actual data to the editing unit 9 for performing editing processing.

The pre-editing unit 13 of the slave board 30 searches the format information on the first page 2001 for the page change position, stores the format information into the format information storage unit 23, and updates the format information in the format information storage unit 21 of the master board 2. The pre-editing unit also updates the read pointer of the receiving buffer 20 and informs the receiver 4 that the pre-editing processing of the first page 2001 has finished (321).

Figure 8:
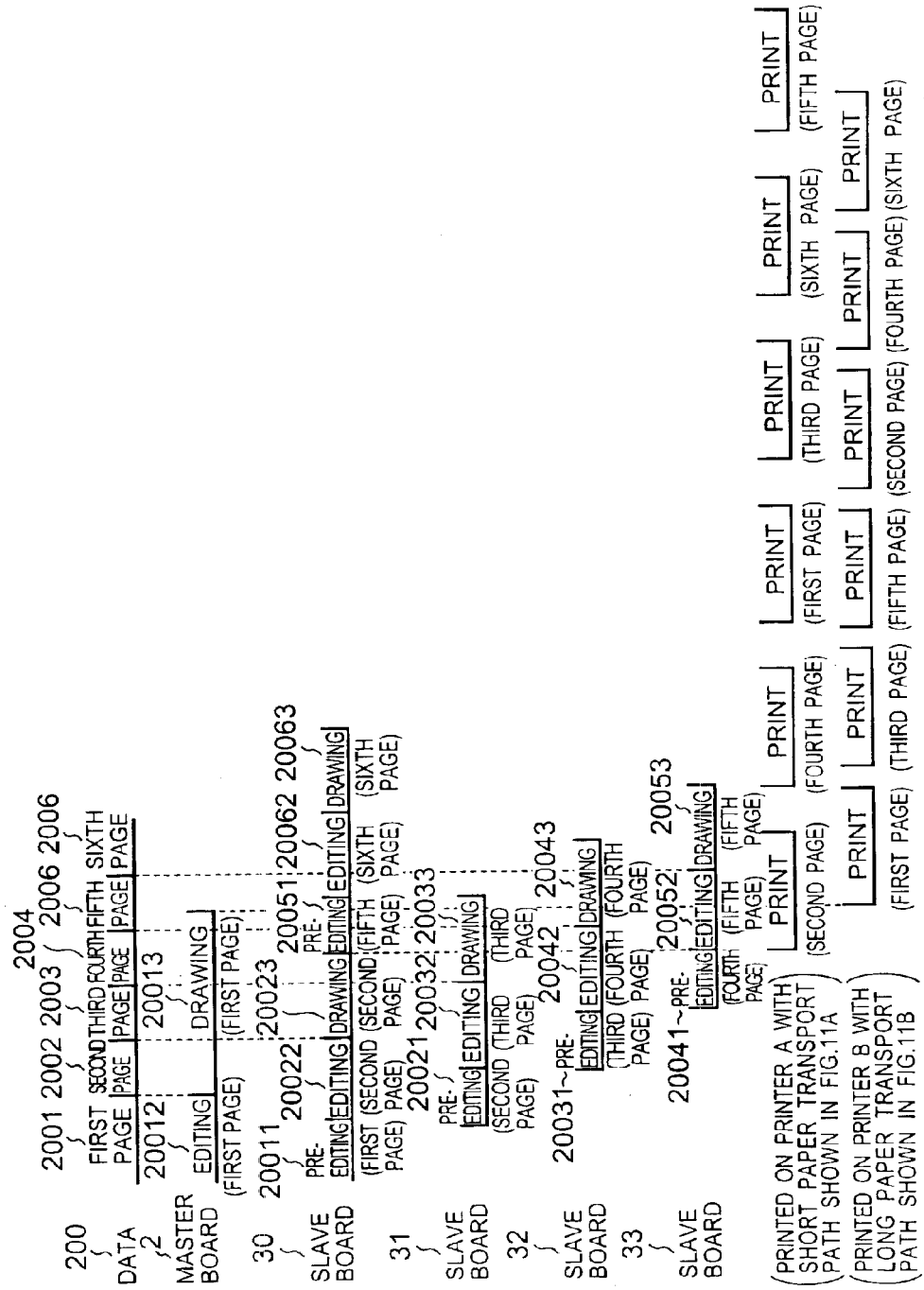
FIG. 8 is a diagram showing the timing chart of the printer shown in FIG. 7.

When the pre-editing processing of the first page 2001 in FIG. 8 is completed (321), the pre-editing unit 13 of the slave board 30 issues a data acquisition request 306 again as an editing request.

The receiver 4 allows the editing unit 14 of the slave board 30 to start the editing processing of the second page 2002 without waiting for the completion of the editing processing of the first page 2001.

In addition, the receiver 4 sends (340) data stored in the position pointed to by the updated read pointer and in the following positions to the pre-editing unit 13 of the slave board 30 as the pre-editing data of the second page 2002.

When the editing processing on the master board 2 is completed (331), the page change position detected by the pre-editing unit 13 of the slave board 30 is compared with the page change position detected by the editing unit 9 to check if they are the same. When the page change positions differ and the page change position detected by the pre-editing unit 13 is nearer to the start of the acquired received data, information from the page change position detected by the pre-editing unit 13 to the page change position detected by the editing unit 9 is passed to the editing unit 14. Because the editing unit 14 performs extra editing, the editing data received from the editing unit 9 is deleted. Conversely, when the page change position detected by the editing unit 9 is nearer to the start of the receiving buffer, the editing unit 9 performs the editing processing of data from the page change position detected by the editing unit 9 to the page change position detected by the pre-editing unit 13 and passes the result to the editing unit 14 of the slave board 30.

In this way, by adjusting editing data with the other processor after completion of the editing processing, the page change position can be detected correctly although the immediately-preceding page and the currently-editing page are asynchronous and, at the same time, the correct format information can be passed.

Similarly, on the slave board 31, the editing data of the second page 2002 processed by the slave board 30 is compared with the page delimiter position detected by the pre-editing unit of the slave board 31 for corrected editing processing. In this manner, even when the slave boards 30, 31, 32, and 33 are used, the operation is performed in the same manner as when the master board 2 and one slave board are used. Added processors reduce the load of each processor, thus improving performance.

In addition, referring to FIG. 10, the following describes how processing is continued when a large amount of form data or external-character data is received and the receiving buffer becomes full.

When the receiver 4 of the master board 2 receives a large amount of form data or external-character data and a receiving buffer full condition occurs in which no free area is found in the receiving buffer 20, the receiver stops receiving data. At this time, the editing unit 9 of the master board 2 sends a data acquisition request 301 to the receiver 4 to perform editing processing for the mth page.

The pre-editing unit 13 of the slave board 30 sends a data acquisition request 302 for the mth page to the receiver 4 to perform pre-editing processing for the editing processing of (m+1)th page. In response to the data acquisition requests 301–305 from all processors, including the data acquisition requests 303–305 from the slave boards 31–33 which have already issued data acquisition requests, the receiver 4 performs data sending services 311 and 312 for the editing unit 9 of the master board 2 and for the pre-editing unit 13 of the slave board 30.

Next, the pre-editing unit 13 of the slave board 3 adds a receiving-buffer full parameter to a pre-editing end notification 321 and sends it to the receiver 4. At this time, the read pointer is not updated.

The pre-editing unit 13 of the slave board 3, which has not yet detected the page change position, sends a data acquisition request 306 to the receiver 4 again. However, the receiver 4 which has no data to send cannot perform data sending service for the data acquisition request 306 received from the pre-editing unit 13 of the slave board 30.

After that, the editing unit 9 of the master board 2 sends an editing end notification 331 to the receiver 4 and updates the read pointer. Then, the editing unit sends a data acquisition request 307 to the receiver because one page of editing processing is not yet completed.

In response to the buffer full notification, the receiver 4 checks that data acquisition requests 307, 306, 303, 304, and 305 have been received from all processors. The receiver checks those requests to confirm that all processors has no received data to edit.

After confirming the requests from all processors, the receiver 4 issues receiving-buffer data copy requests 313, 314, 315, and 316 to all processors, except the one that is performing editing processing, as a parameter of data sending services 313, 314, 315, and 316 to ask each processor to receive data from the receiving buffer 20 into the local memory of the processor. The receiver does not pass data to a processor which is performing editing processing because data is already copied into the local memory and there is no need to copy data any more.

Upon receiving the request, the pre-editing unit 13 of the slave board 30, the pre-editing unit (not shown) of the slave board 31, the pre-editing unit (not shown) of the slave board 32, and the pre-editing unit (not shown) of the slave board 33 store data into the local memory, inform the receiver 4, through a parameter of pre-editing end notifications 322, 323, 324, and 325, that the restoration of the receiving-buffer full condition is completed, and then updates the read pointer.

The receiver 4, which has confirmed the notifications from all processors, resumes data reception and performs data sending service 317, which is not yet completed for one full page, for the editing unit 9 of the master board 2 and the pre-editing unit 13 of the slave board 30.

As described above, reception processing and video output processing are executed in the DMA mode. Therefore, the page-basis parallel processing, from editing to drawing, is performed in parallel, and most of the processing time is used for parallel processing. This means that performance increases as more slave boards are used. Therefore, the number of slave boards should be decreased for low-speed engines, and increased for high-speed engines, to enable the same algorithm to cover a wide range of printers, from low-speed to high-speed.

In addition, the programmable configuration of a user interface 5 and the output controller 6 shown in FIG. 1 and the definite definition of an interface (data exchange protocol) between the basic unit 7 and the processing unit allow the same algorithm to implement the function by simply changing the user interface 5 and the output controller 6 with no effect on other processing units even when the specifications of the operator panel 18 and the printer engine 19 are changed.

Figure 11A:
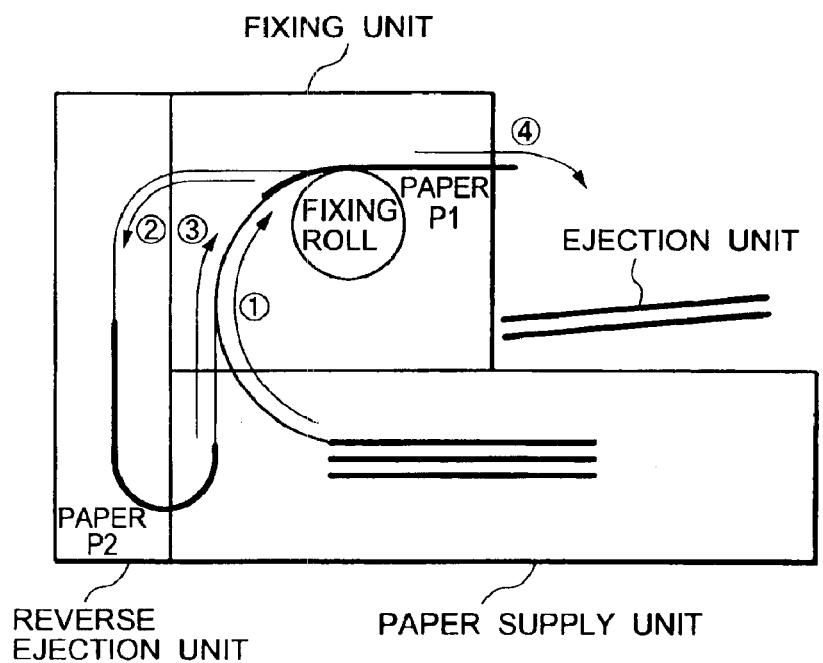
FIGS. 11A and 11B are diagrams showing examples of printer configurations.

The operation of the output controller 6 in the printer configuration shown in FIGS. 11A and 11B will be described. Each of the two printer engines in this example has its own print order during double-sided printing. FIG. 11A shows printer A with a printer engine whose paper transport path is short. The printer transports two pieces of paper at a time. In this printer A, the first paper is supplied and print data is fixed on the face of the first paper transported in the direction of arrow 501, and the paper is transported in the direction of arrow 502. Next, the second paper is supplied in the direction of arrow 501, print data is fixed on the face of the second paper, and the paper is transported in the direction of arrow 502. After that, the first paper is transported in the direction of arrow 503, print data is fixed on the reverse of the first paper, and the paper is ejected in the direction of arrow 504. Finally, print data is fixed on the reverse of the second paper, and the paper is ejected in the direction of arrow 504. In this way, the print order is the face of the first paper, the face of the second paper, the reverse of the first paper, the reverse of the second paper, the face of the third paper, and so on.

Figure 11B:
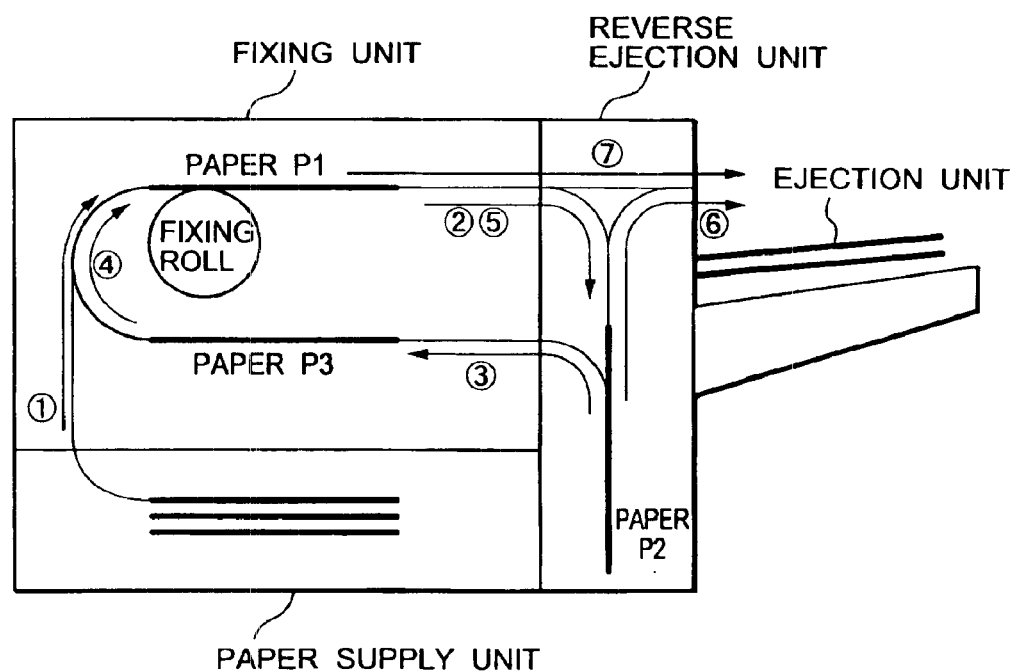
Figure 12:
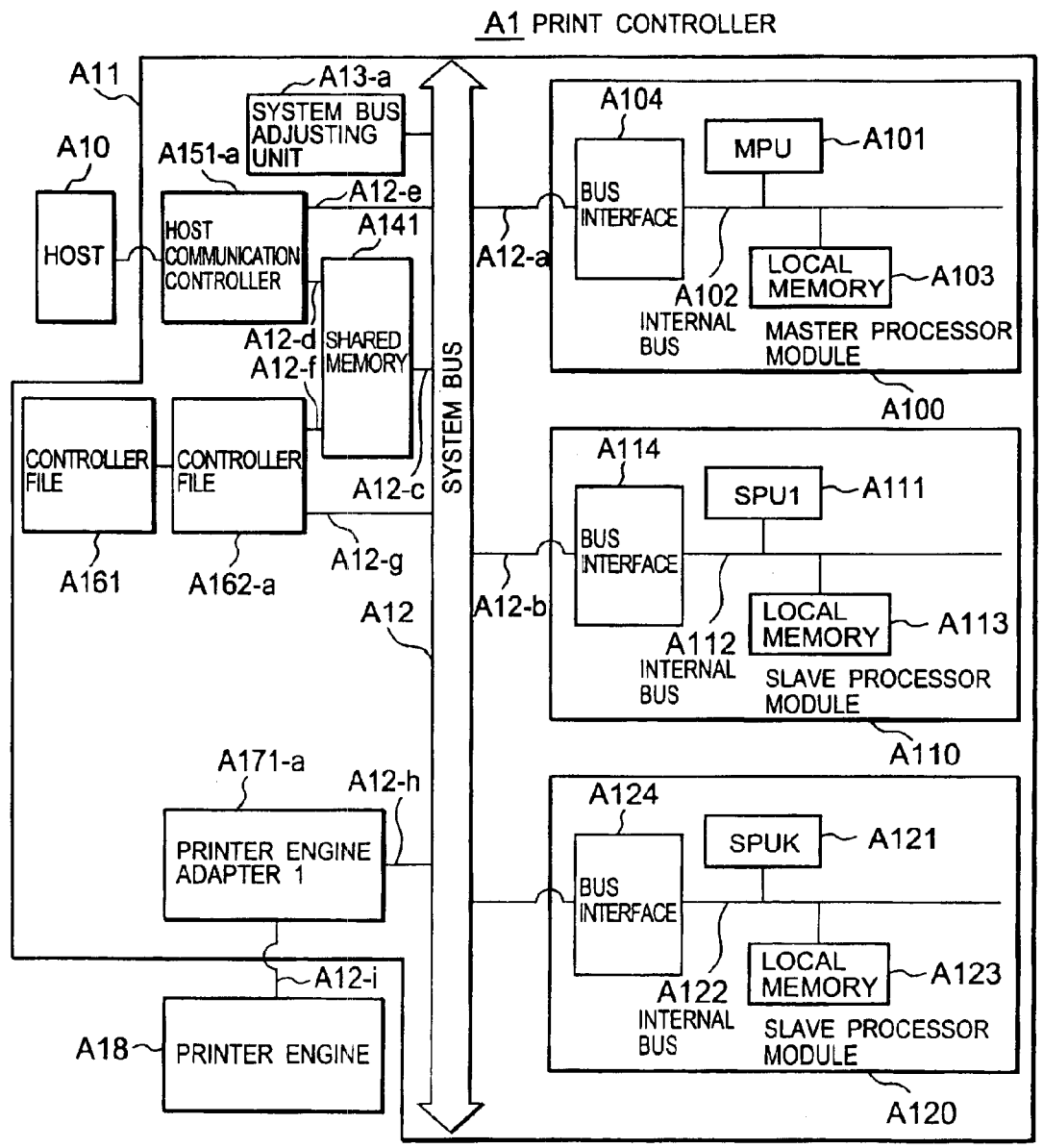
FIG. 12 is a diagram showing the configuration of a print controller in the prior art.
Figure 13:
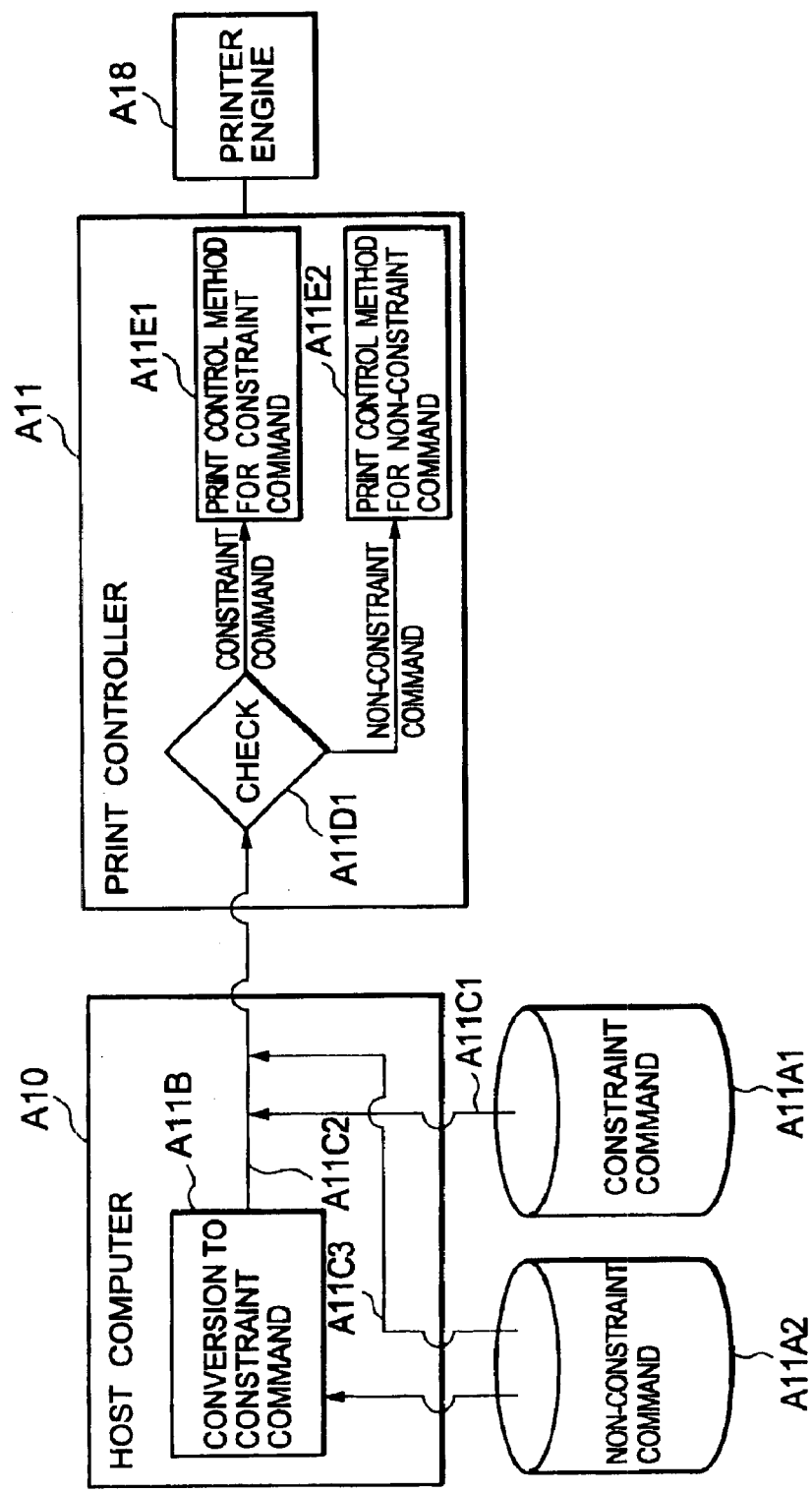
FIG. 13 is a diagram showing the command system of the print controller shown in FIG. 12.
Figure 14:
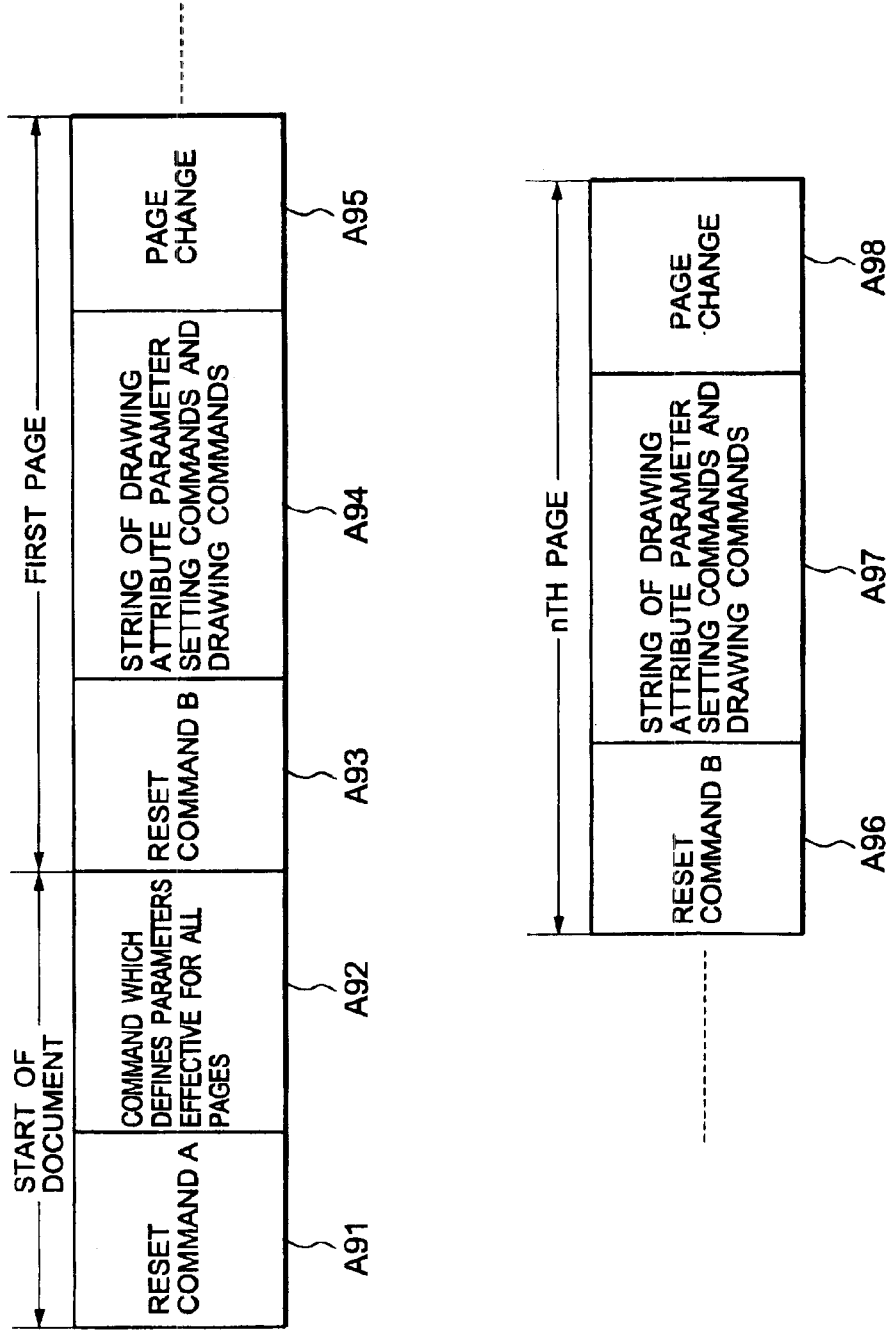
FIG. 14 is a diagram showing the details of command data of the print controller shown in FIG. 12.
Figure 15:
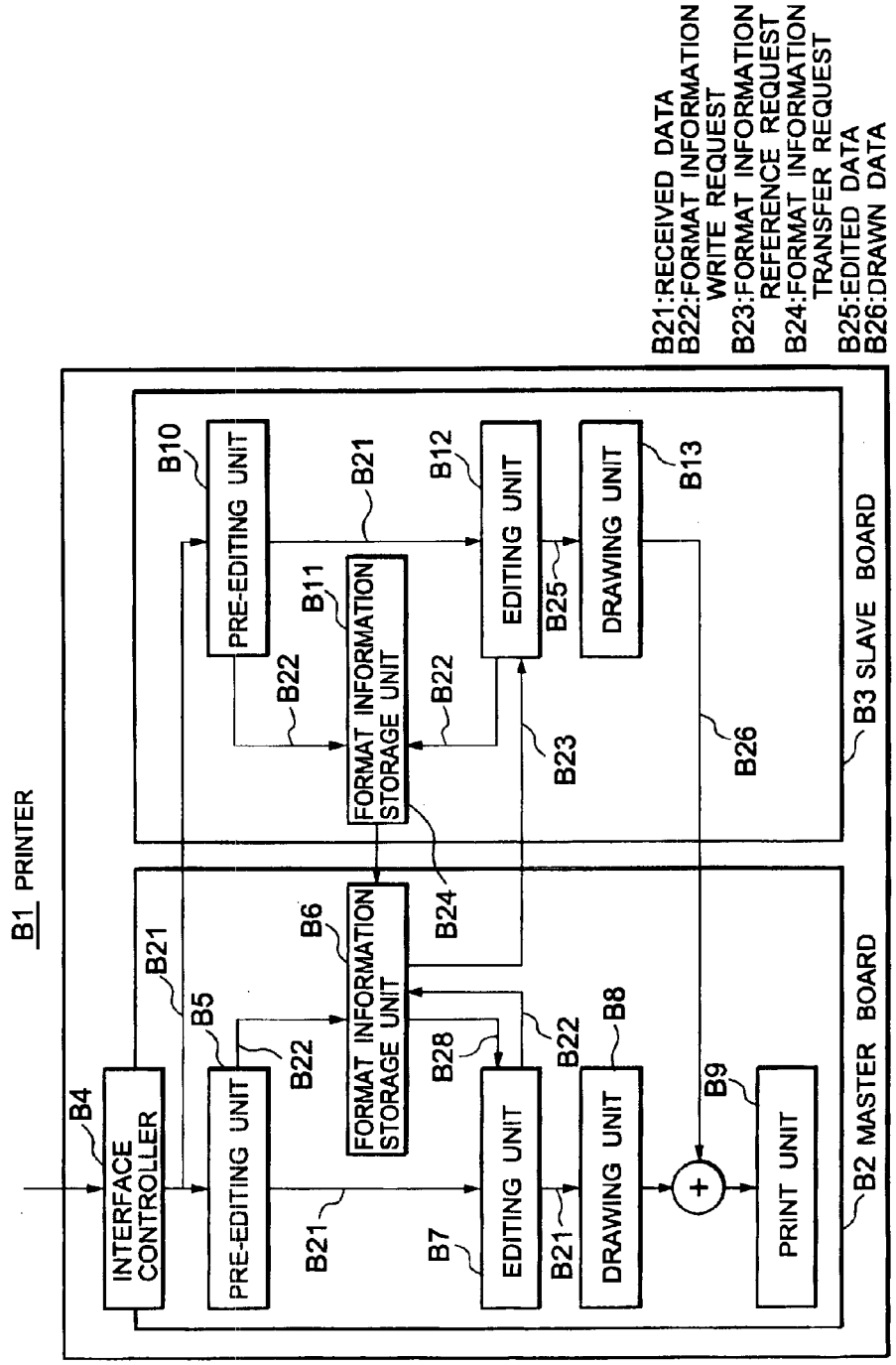
FIG. 15 is a diagram showing the configuration of a printer in the prior art.
Figure 16:
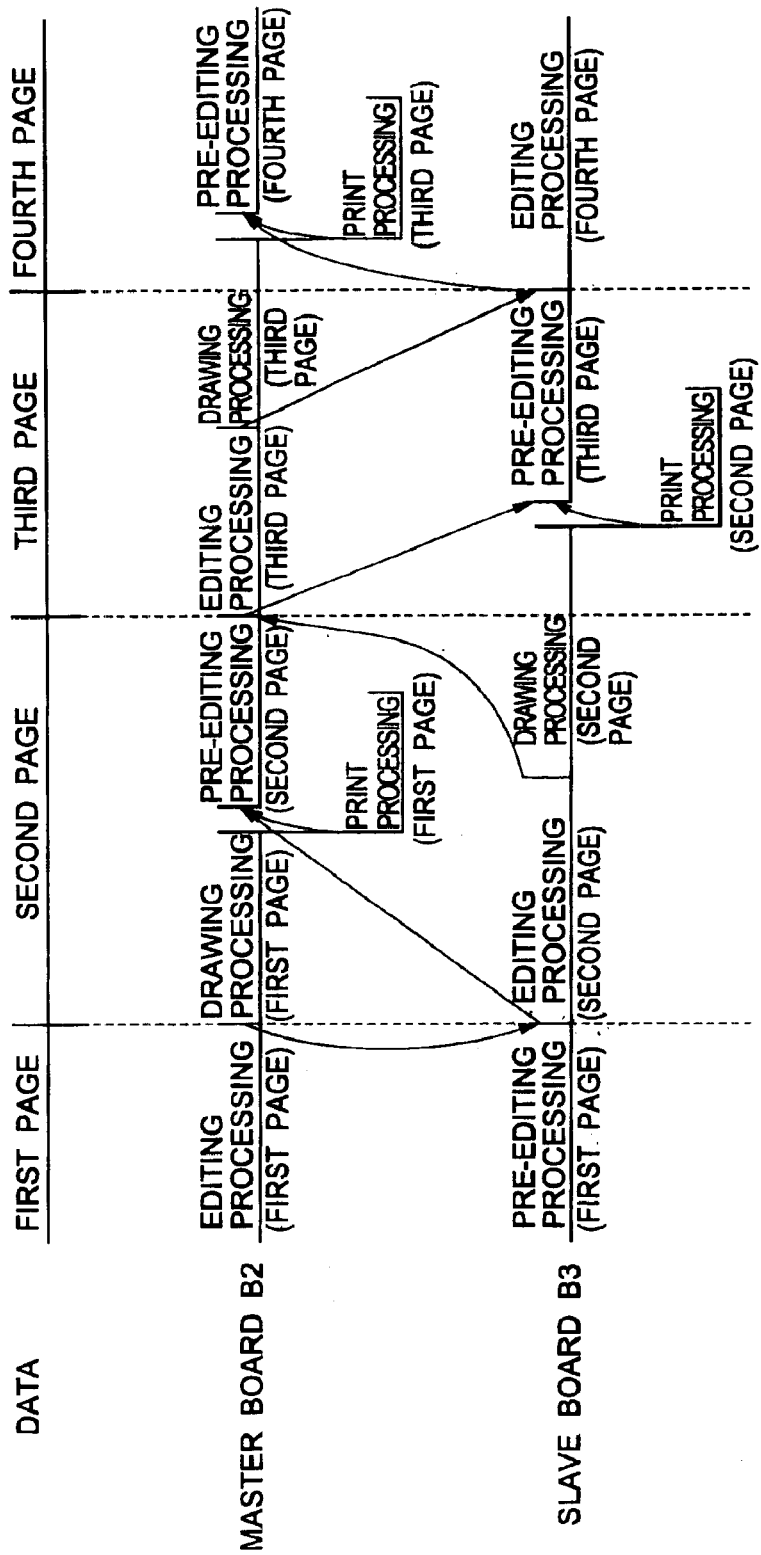
FIG. 16 is a diagram showing the timing chart of the printer shown in FIG. 15.

FIG. 11B shows printer B with a printer engine whose paper transport path is long. This printer transports three pieces of paper at a time. In this printer B, the first paper is supplied, print data is fixed on the face of the first paper transported in the direction of arrow 601, and the paper is transported in the direction of arrow 602. Next, the second paper is supplied in the direction of arrow 601, print data is fixed on the face of the second paper, and the paper is transported in the direction of arrow 602. At this time, the first paper is transported in the direction of arrow 603. Then, the third paper is supplied in the direction of arrow 601. After that, the transportation operations of the three pieces of paper in printer B are interrelated. That is, when the first paper is supplied in the direction of arrow 604, the second paper is transported in the direction of arrow 603, the third paper is transported in the direction of arrow 602, and print data is fixed on the reverse of each paper. After printed data is fixed, the papers are transported in the direction of arrows 605 and 606 and reverse-ejected. In this case, the print order is the reverse of the first paper, the reverse of the second paper, the reverse of the third paper, the face of the first paper, the face of the second paper, the face of the third paper, the reverse of the fourth paper, and so on. For a printer engine with a feature that does not reverse-eject papers to increase print performance (paper is transported in the direction of arrow 607), the print order is the face of the first paper, the face of the second paper, the face of the third paper, the reverse of the first paper, the reverse of the second paper, the reverse of the third paper, the face of the fourth paper, and so on. The print order is one of control methods for maximizing the print performance of the printer. For data requiring long in editing or drawing such as the one shown in FIG. 4 or FIG. 8 or for two pages of data (one piece of paper), another control method may be used. Considering all these cases, print data is queued on a page basis with the print order controlled by pointers. This allows pages to be re-ordered simply by changing the queue (pointers), making the management easy.

A plurality of programs may be prepared for the user interface 5 and the output controller 6 to allow a program best suited for the device configuration to be selected.

As described above, the printer according to the present invention eliminates the need for replacing, via the printer driver or the data filter, existing line-printer user data with data coded in page printer description language, enabling a page printer to print data quickly and correctly. In addition, even when a large amount of form data or external character data exceeding the receiving buffer size is received, the printer may continue printing without having to check whether editing is completed for one full page.

While this invention has been described in conjunction with the preferred embodiments described above, it will now be possible for those skilled in the art to put this invention into practice in various other manners.

What is claimed is:

1. A printer which draws page data for outputting one page at a time, the page data being edited from a line printer output format to a page format based on format information, said printer comprising:
   one master board and one or more slave boards each executing:
      pre-editing processing in which a temporary page change position delimiting pages is calculated with the data unedited;
      editing processing in which data in a next page following the temporary page change position is edited based on the format information to define an actual page change position and the temporary page change position is corrected by the actual page change position to define the page data of the next page; and
      drawing processing in which the page data is drawn,
   wherein said master board and slave boards execute the pre-editing processing of the data before the editing processing and the drawing processing,
   wherein said master board comprises:
      a basic unit transferring the data and control information to or from processing units and to or from said slave boards,
   wherein said processing units, all connected to said basic unit, comprise:
      a receiver which receives data from a host computer;
      a receiving buffer in which the data is stored;
      a pre-editing unit which acquires data from said receiving buffer and calculates the temporary page change position;
      a second format information storage unit in which format information on a next page following the temporary page change position is stored;
      a first format information storage unit in which format information common to edited pages is accumulated by obtaining the format information on the edited pages from said second format information storage unit;
      an editing unit which edits the next page following the temporary page change position defined by said pre-editing unit to define the actual page change position based on the format information stored in said first and second format information storage units, corrects the temporary page change position with the actual page change position, and defines the page data of the next page;
      a drawing unit which generates drawing data from the page data,
      a print controller which converts the drawing data into video output data;
      an output controller which transfers the video output data sent from said print controller and from a print controller of said slave boards to a printer engine to manage a page of the video output data; and
      a user interface which sends or receives operation information to or from an operator panel operated by a user.

2. The printer according to claim 1, wherein
   said receiving buffer cyclically uses a buffer area in which data from the host computer is stored and an area which is used for the editing processing and, when the buffer becomes full before the page change position is detected during the editing processing, stops receiving the data and synchronizes the format information by distributing the so-far received data among the master board and the slave board to avoid a buffer overflow and to continue processing.

3. The printer according to claim 1, wherein the common format information, which comprises the format information passed across edited paged, includes one or more of character pitch information, character size information, left margin information, right margin information, horizontal tab information, vertical tab information, line feeding information, font information, character decoration information, paper size information, print orientation information, number-of-copies information, form information, external character definition information, and page change information.

4. A printer which draws page data for outputting one page at a time, the page data being edited from a line printer output format to a page format based on format information, said printer comprising:
   one master board and one or more slave boards each executing:
      pre-editing processing in which a temporary page change position delimiting pages is calculated with the data unedited;
      editing processing in which data in a next page following the temporary page change position is edited based on the format information to define an actual page change position and the temporary page change position is corrected by the actual page change position to define the page data of the next page; and
      drawing processing in which the page data is drawn,
   wherein said master board and slave boards execute the pre-editing, processing of the data before the editing processing and the drawing processing, wherein
   each of said slave boards comprises:
      a basic unit transferring the data and control information to or from processing units and to or from said master board;
   wherein said processing units, all connected to said basic unit, comprise:
      a pre-editing unit which calculates the temporary page change position of data acquired from a receiving buffer;
      a second format information storage unit in which format information on a next page following the temporary page change position is stored;
      an editing unit which edits the next page to define the actual page change position based on the format information stored in a first format storage unit in which common format information is stored and in said second format information storage unit, corrects the temporary page change position with the actual page change position, and defines the page data of the next page;
      a drawing unit which generates drawing data from the page data; and
      a print controller which converts the drawing data into video output data.

5. A printer which draws page data for outputting one page at a time, the page data being edited from a line printer output format to a page format based on format information, said printer comprising:
   one master board and one or more slave boards each executing:
      pre-editing processing in which a temporary page change position delimiting pages is calculated with the data unedited;

editing processing in which data in a next page following the temporary page change position is edited based on the format information to define an actual page change position and the temporary page change position is corrected by the actual page change position to define the page data of the next page; and drawing processing in which the page data is drawn, wherein said master board and slave boards execute the pre-editing processing of the data before the editing processing and the drawing processing, wherein said pre-editing unit checks whether or not statements coded in a page printer description language are present and, when statements coded in the page printer description language are found, defines a position defined by page change information as the page change position and, when there is no statement coded in the page printer description language, calculates the temporary page change position from a number of characters and a number of lines, the temporary page change position delimiting pages.

6. A printer comprising:

two or more boards, each comprising:

a pre-editing unit which performs pre-editing processing in which, in order to delimit received data into pages, format information is extracted from a start of non-delimited data beginning with the start of the received data and a temporary page change position is calculated, said temporary page change position being a trailing end of a page whose leading end is the start of the non-delimited data, an editing unit which performs editing processing in which data following the temporary page change position is edited and an actual page change position is calculated to output editing data of a page, said actual page change position being an actual trailing end of the page whose leading end is the temporary page change position; and a drawing unit which performs drawing processing in which the edited data is drawn and-video output data is generated, wherein, when a pre-editing unit of a first board completes first pre-editing processing, a pre-editing unit of a second board where none of pre-editing processing, editing processing, and drawing processing is performed starts pre-editing processing in which, even if the first editing processing calculating an actual page change position of a page whose temporary page change position was calculated by the first pre-editing processing is not yet completed, a temporary page change position of a page beginning with the temporary page change position calculated by the first pre-editing processing is calculated.

7. The printer according to claim 6, further comprising format information storage units in which format information and page change position information included in received data and obtained by the pre-editing processing and the editing processing are stored, wherein said pre-editing unit updates, during the pre-editing processing, the information stored in said format information storage units based on the format information extracted from data of a page whose leading end is the start of non-delimited data and on said temporary page change position, and said editing unit updates the information stored in said format information storage units based on the format information obtained by editing the data of the page whose leading end is the temporary page change position and on the actual page change position.

8. The printer according to claim 7, wherein, after said editing unit calculated an actual page change position of a page, and when an actual page change position of a preceding page of said page is calculated, said editing unit calculates the actual page executes the process of:

(a) calculating an actual trailing end of said page based on the actual page change position of the preceding page, (b) correcting the temporary page change position and the actual page change position calculated of said page based on said actual trailing end, (c) updating the format information stored in said format information storage units based on the actual page change position of the preceding page and the corrected actual page change position, and (d) outputting editing data existing from the actual page change position to the corrected page change position.

9. The printer according to claim 7, wherein, when the pre-editing processing is completed, said pre-editing unit does not update the format information stored in the format information storage units but completes the pre-editing processing if the editing processing calculating the actual page change position corresponding to the calculated page change is completed.

* * * * *